United States Patent
Tietjen

[11] Patent Number: 6,036,130
[45] Date of Patent: Mar. 14, 2000

[54] HY-TORQUE FISHING REEL HANDLE

[76] Inventor: Karsten E. Tietjen, 1223 Ridgebury Rd., New Hampton, N.Y. 10958

[21] Appl. No.: 09/145,114

[22] Filed: Sep. 2, 1998

Related U.S. Application Data

[63] Continuation-in-part of application No. 08/895,071, Jul. 16, 1997, abandoned.

[51] Int. Cl.[7] .................................................. A01K 89/00
[52] U.S. Cl. ........................... 242/256; 242/283; 242/323
[58] Field of Search .................................... 242/283, 256, 242/389, 323; 192/44, 45

[56] References Cited

U.S. PATENT DOCUMENTS

| | | | |
|---|---|---|---|
| 700,559 | 5/1902 | Rockwell | 242/283 |
| 918,451 | 4/1909 | Johnson | 192/45 |
| 1,511,226 | 10/1924 | Lawrence | 192/45 |
| 2,531,816 | 11/1950 | Homoky | 242/256 |
| 2,664,183 | 12/1952 | Payne | 192/45 |
| 2,792,792 | 5/1957 | Seewer | 192/45 |
| 2,836,995 | 6/1958 | Heddy | 242/283 |
| 2,855,024 | 10/1958 | Robb | 192/45 |
| 4,850,548 | 7/1989 | Faulkner | 242/256 |
| 4,881,698 | 11/1989 | Doiron | 242/256 |

*Primary Examiner*—Katherine A. Matecki
*Attorney, Agent, or Firm*—Frank A. Lukasik

[57] ABSTRACT

A combination of a fishing reel and a one-way clutch handle comprising a ring with an inner periphery clutch surface, a mounting hole and a plurality of threaded mounting holes, a circular shaped clutch element having a rectangular shaped center hole, a plurality of cam surfaces and a plurality of flat surfaces forming a space wherein a spring and a roller are placed. A handle arm is fastened to the ring to form the handle.

3 Claims, 5 Drawing Sheets

HY-TORQUE FISHING REEL HANDLE

RELATED INVENTION

This invention is a Continuation-In-Part of U.S. Ser. No. 08/895,071, Filed Jul. 16, 1997 now abandoned.

BACKGROUND OF THE INVENTION

1. Field of the Invention

This invention relates to fishing reels and more particularly to a reel handle with a one-way clutch incorporated therein.

2. Description of the Prior Art

The prior art fishing reels suffer from a common fault, that is, when a large fish is hooked, it takes great strength to reel the fish in. A prior art fishing reel requires continuous turning of the reel handle to reel in a fish. Because of the inflexibility of the design, there are certain portions of the rotation of the handle where greater force must be applied, and other portions where the leverage is increased and less power is necessary to rotate the handle.

One-way clutches have been used in fishing reels for various reasons. One such clutch device is taught by U.S. Pat. No. 5,322,240 to Sato which discloses a fishing reel with a friction type rotation restrictor is mounted on the handle shaft between the drive gear and handle and linked to a reel body through a one-way clutch. The rotation restrictor prevents rotation in a line unwinding direction of the drive gear and spool against a tension applied to the fishing line and regardless of a stopping phase of the spool.

U.S. Pat. No. 2,604,273 to Hayes discloses a fishing reel with a brake mechanism which may be rapidly brought into action with a preadjusted tension. In operation, the brake mechanism is applied or brought into action and by adjustable devices the tension is set with consideration for the tensile strength of the line employed, so that the spool will rotatably yield to a pull on the line below such value as would cause the line to break. After such tension has been established, the simple movement of an interposer will free the brake to enable casting or free spooling. To reaply the brake, it is simply necessary to shift the interposer back, and in doing so the brake will become applied with the previously set tension.

U.S. Pat. No. 2,306,259 to Khoenle discloses a fishing reel having a spool and a spool shaft, an end plate, a housing on the end plate, the shaft extending into the housing, a plurality of superposed friction elements located in the housing, one of which is a ring, a clutch mechanism to lock the spool shaft and the ring in one direction of rotation only, the clutch mechanism comprising a cam wheel located within the ring and having a plurality of surfaces which approach the inner surface of the ring, balls located within the spaces between the ring and the cam wheel, and means to prevent the balls from running on the surface of a friction element at the side of the ring.

U.S. Pat. No. 4,850,548 to Faulkner discloses a take up trigger for a fishing reel which includes an annular overrunning clutch having a lock mode and an overrun mode, annularly fitted onto the shaft of the fishing reel with a trigger lever extending from the housing on the clutch, the clutch being oriented on the shaft such that tha clutch overrun mode corresponds to the reel take up mode, whereby the clutch lock mode necessarily corresponds to the trigger take up mode.

Each of the above references attempt to solve the problem of restricting rotation in the line unwinding direction of the handle shaft, the reel, and the rotation restrictor. They do not pertain to the line winding direction. Furthermor, the instant invention may be adapted to fit most of the prior art reels by replacing the standard handle with the high-torque, one way fishing reel handle of the invention.

SUMMARY OF THE INVENTION

In accordance with the invention, there is provided a state-of-the-art system uniquely suited for providing more power for fishermen to reel in large game fish. This added available power will give fishermen a new advantage over fighting fish.

The invention comprises a basic reel handle with a one-way clutch incorporated therein. It has been found that there are certain segments of the reel winding motion of the handle, namely two segments where the fisherman can exert greater forces than in other segments. To visualize the action of the invention, the side of the reel having the handle mounted thereon may be divided into clock segments. For example, the top of the reel is twelve o'clock and the bottom is six o'clock. Considering the clock face, the two power zones are between 11:00 and 2:00 and between 5:00 and 8:00, where a fisherman can apply the most power to the reel handle. On the other hand, the zones between 2:00 and 5:00 and between 8:00 and 11:00 are the most difficult to turn. With the instant invention, the fisherman may select his best power range and continue to wind in that power range repeatedly.

It is therefore an object of the invention to provide an improved system for improving the power range of a fishing reel handle.

It is another object of the invention to provide an improved system for providing two power zones having the greatest mechanical advantage for turning the fishing reel handle.

A still further object of the invention is to provide an improved fishing reel handle with a one-way clutch incorporated therein.

DESCRIPTION OF THE PREFERRED EMBODIMENTS

Figure 1:
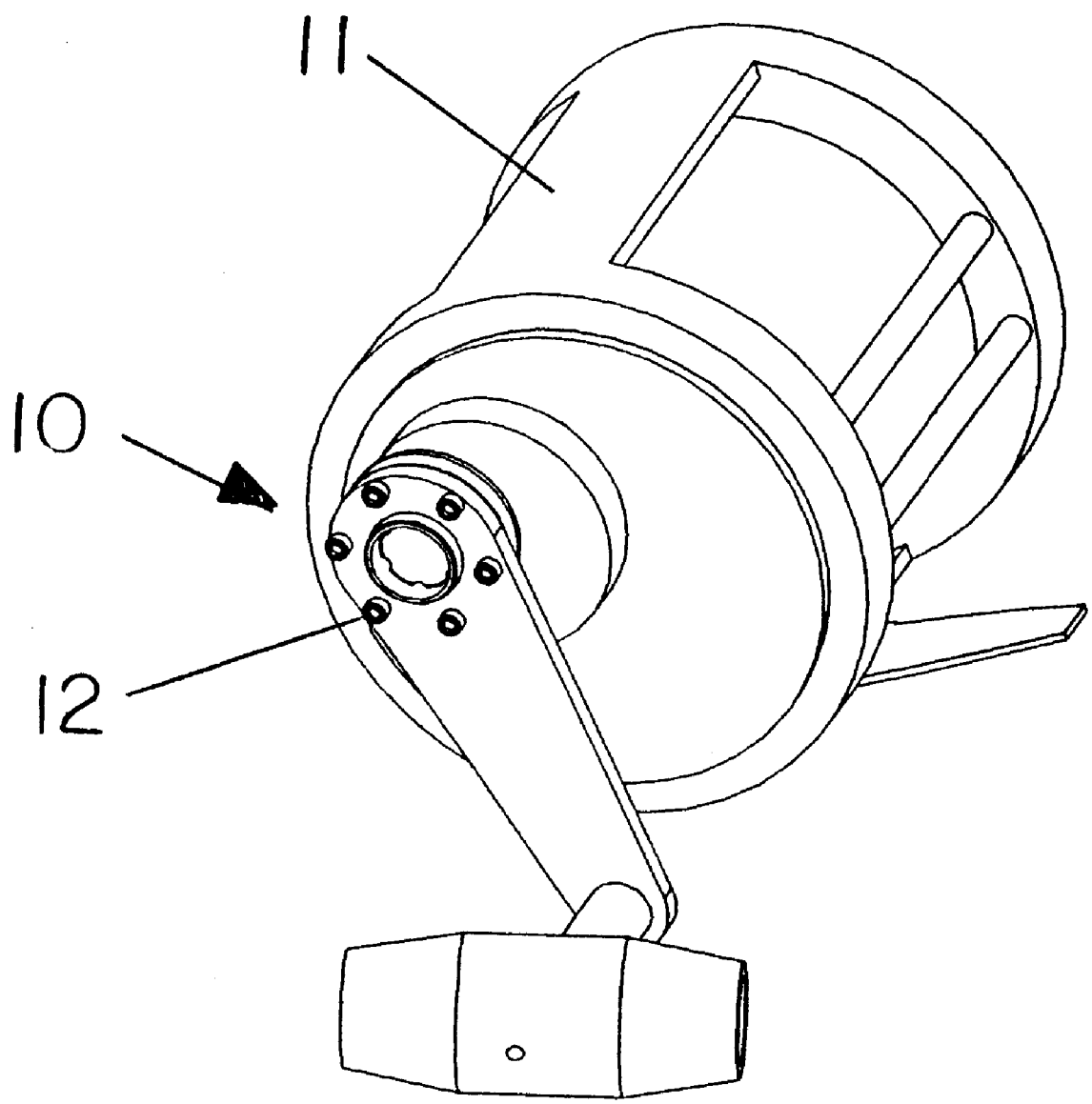
FIG. 1 is a top perspective view of a fishing reel and a high torque, one-way clutch, in accordance with the invention.
Figure 2:
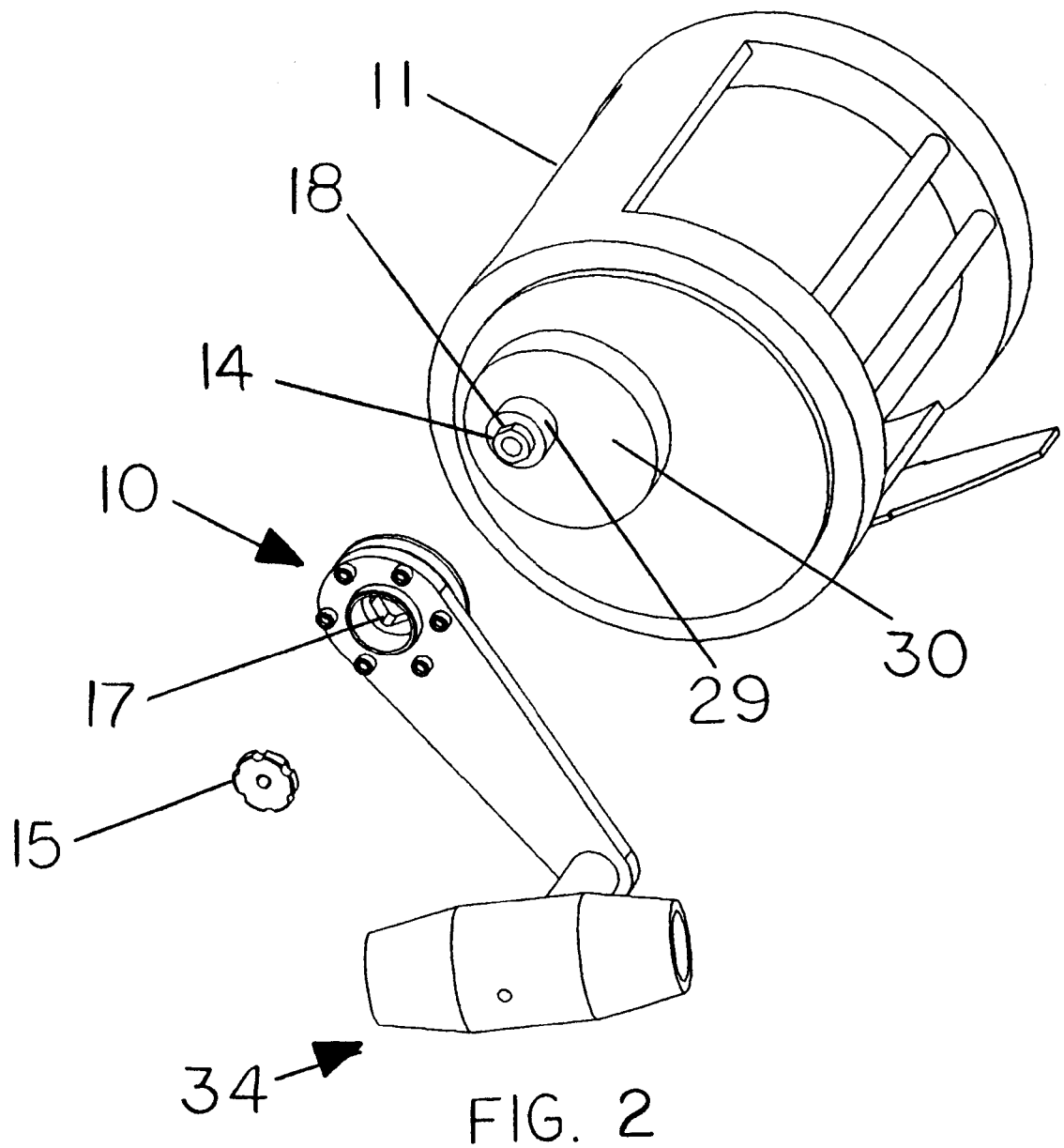
FIG. 2 is an exploded view, of a fishing reel and a high torque fishing reel handle in accordance with the invention.
Figure 3:
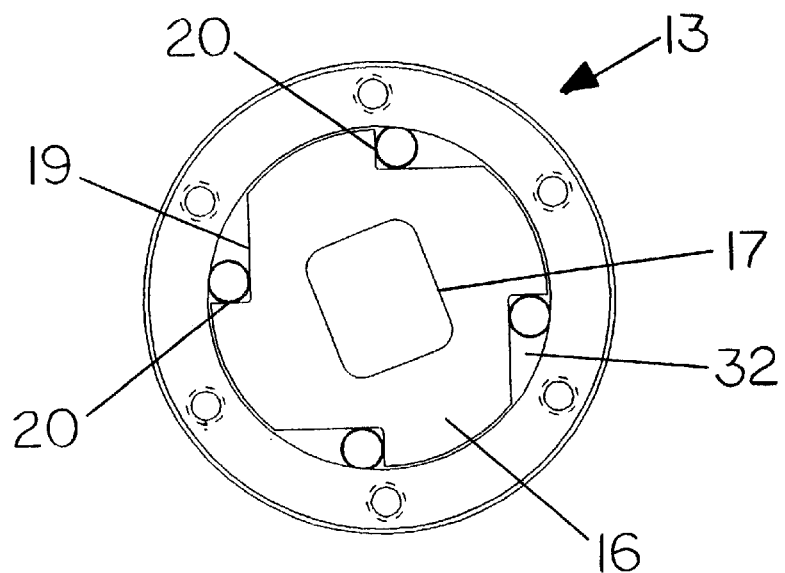
FIG. 3 is a side view of a high torque, one-way clutch in accordance with the invention.

As shown in FIG. 1, the high torque fishing reel handle 10 is mounted on drive shaft 14 of fishing reel 11 with mounting nut 15. In a first embodiment, a Penn International reel, Type 80 W, was fitted with one-way clutch 13.

Figure 4:
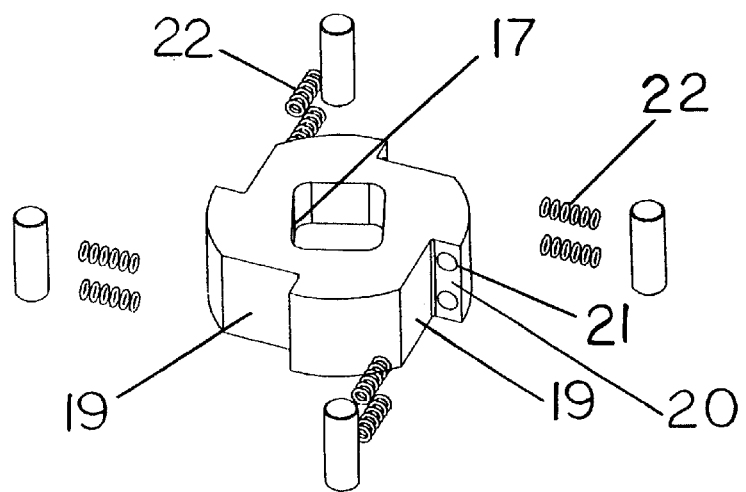
FIG. 4 is an exploded view of a first embodiment of a high torque, one-way clutch in accordance with the invention.
Figure 5:
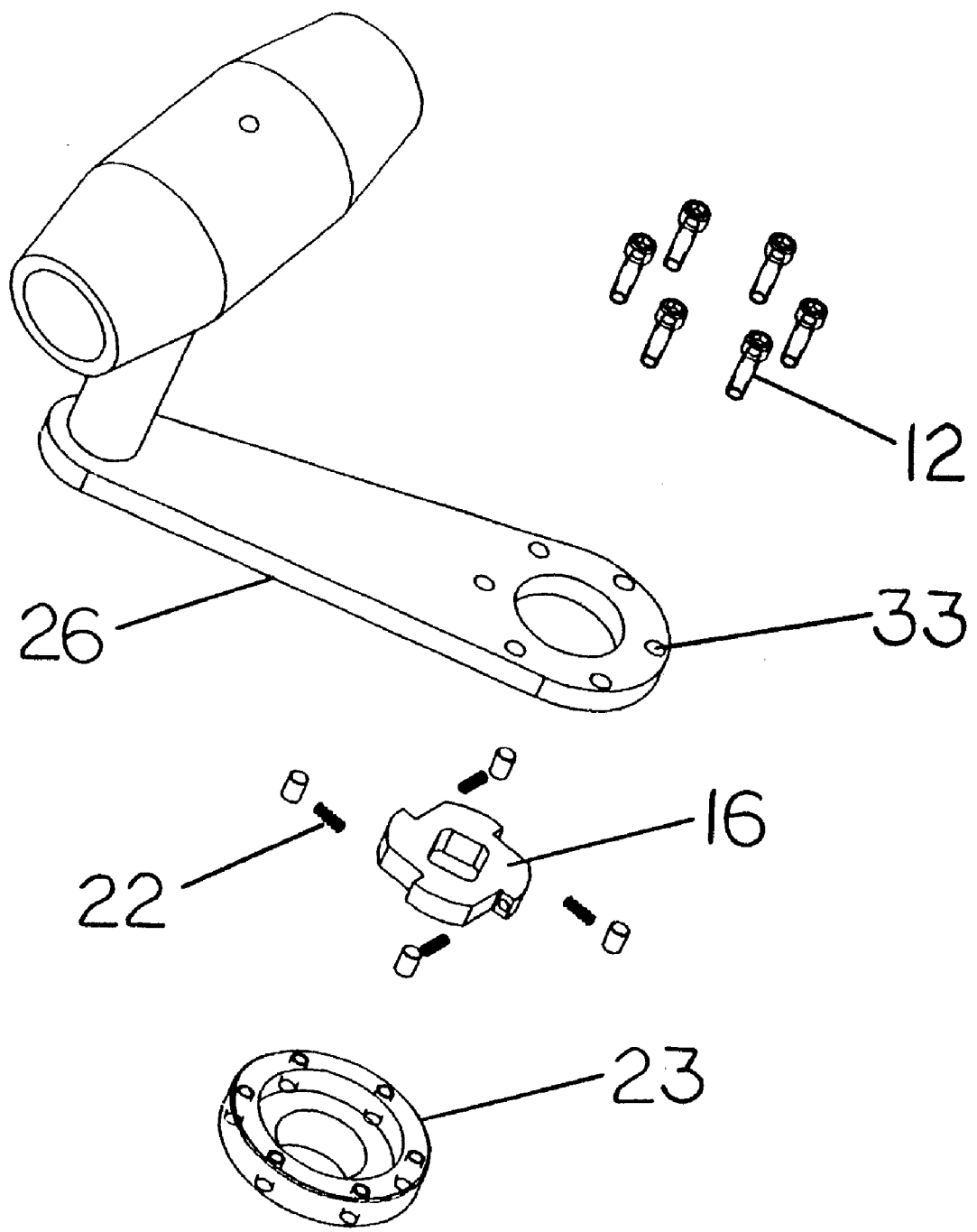
FIG. 5 is an exploded view of a high torque, one-way clutch, fishing reel handle in accordance with the invention.
Figure 6:
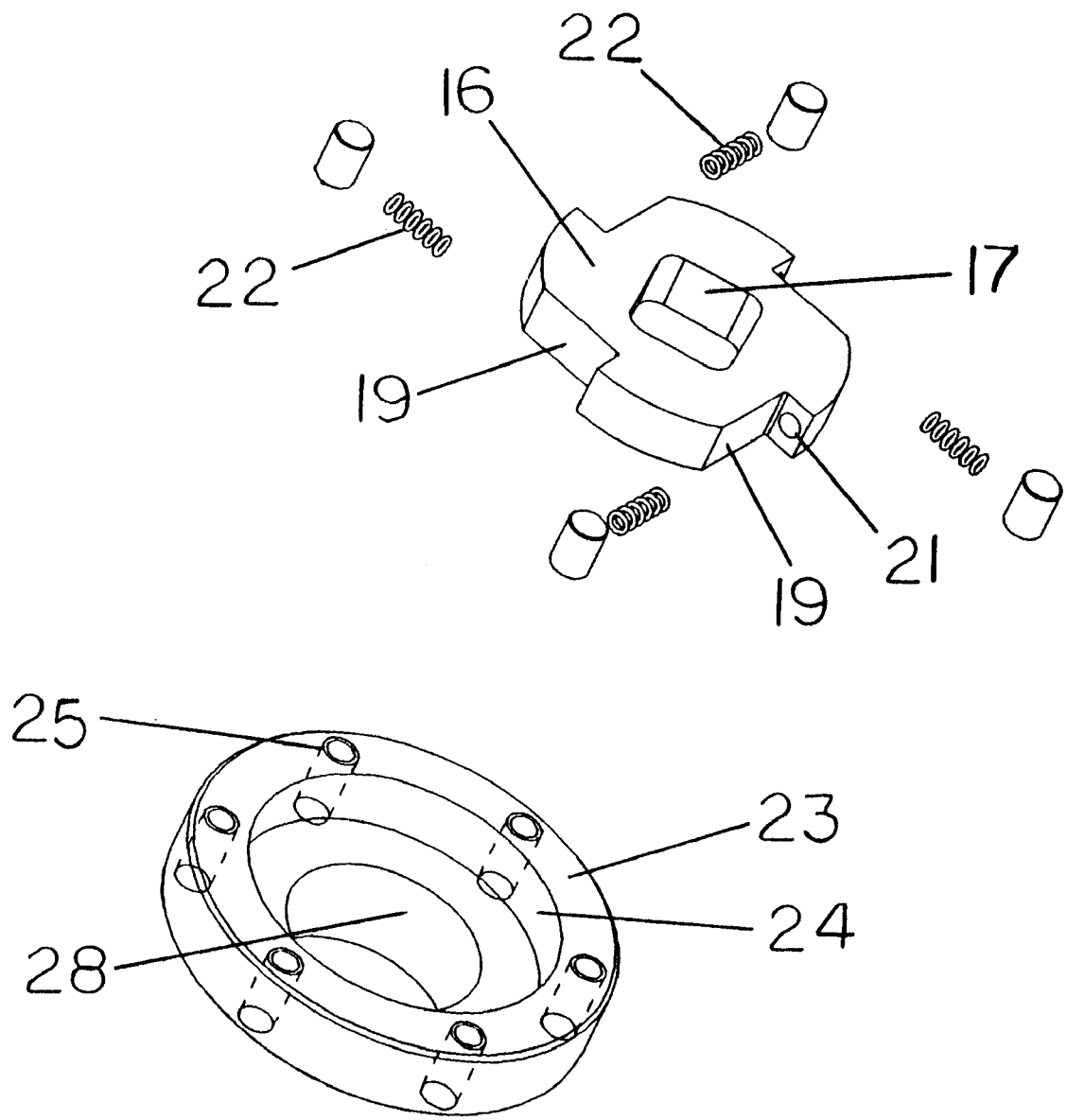
FIG. 6 is an exploded view of a second embodiment of a high torque, one-way clutch in accordance with the invention.

Circular shaped clutch element 16 is formed from stainless steel with a rectangular shaped hole 17 formed at the center. Hole 17 is mated with flattened surfaces 18 formed on shaft 14 of reel 11 to drive the reel 11 when winding the fishing line. Clutch element 16 is formed from a circular shaped, stainless steel blank, in the form of a cam wheel, with a plurality of cam surfaces 19, each of which is formed parallel to the center line of clutch element 16. Flat surfaces 20 are formed perpendicular to cam surfaces 19 along a center line drawn perpendicular to the cam surfaces 19. Flat surfaces 20 contain holes 21 formed to act as seats for springs 22. FIG. 4 is an exploded view of a first embodiment of the invention having two holes 21 in each flat surface 20. FIG. 6 is an exploded view of a second embodiment of the invention having one hole 21 in each flat surface 20.

The clutch element 16 is mounted in a ring 23 having an inner periphery 24 which acts as a clutch surface. Threaded mounting holes 25 are formed in ring 23 to accept mounting screws 12 when ring 23 is mounted on handle arm 26. Ring 23 contains a mounting hole 28 which mates with protrusion 29 on the front plate 30 of reel 11, for driving the reel 11.

Rollers 31 are formed from stainless steel rod and are formed at a length depending on the inner depth of inner periphery 24 formed in ring 23. In the embodiment of the invention having the single spring 22 configuration, the rollers 31 are shorter than the rollers 31 in the embodiment having the two spring 22 configuration.

When assembling the one-way clutch 13 of the invention, the ring 23 is placed within the inner periphery 24 of ring 23. Springs 22 are then placed within the holes 21 of ring 23 and the rollers 31 are inserted in the space 32 formed within the space 32 between the cam surface 19 and the inner periphery 24 of clutch element 16. The handle arm 26, having mounting holes 33, is then fastened to ring 23 with mounting screws 12 to seal the assembled one-way clutch 13 in an operating position.

Handle arm 26 is fitted with an aluminum "Tee" grip 34 at the end opposite the one-way clutch 13. "Tee" grip 34 is weighted at end 36 to assure that the handle arm 26 and "Tee" grip 34 hang in the vertical position. The one-way clutch 13 locks and does not slip when pressure is applied for line retrieval and releases as soon as pressure is reversed. The high torque fishing reel handle 10 hangs downwardly in the vertical position when pressure is reversed. This is an added benefit to the fisherman. When the fishing rod is in a rod holder, the handle 10 is clear of the lever drag system of the reel. The position of the handle 10 also provides confidence in knowing where the handle 10 is at all times, thereby saving fumbling around when a fish strikes. A further advantage of the instant invention is that the handle 10 is the ability to adapt to any commercially available fishing reels by merely changing the size of the hole 17 to accomodate the flat surfaces 18 formed on shaft 14.

The invention may be embodied in other specific forms without departing from the spirit or essential characteristics. The present embodiments are therefore to be considered in all respects as illustrative and not restrictive, the scope of the invention being indicated by the appended claims, and all changes which come within the meaning and range of equivalency of the claims are therefore intended to be embraced therein.

What is claimed is:

1. A combination of a fishing reel having a drive shaft, and an improved fishing reel handle having a one-way clutch handle incorporated therein, said fishing reel handle consisting of:

a ring having an inner periphery clutch surface, a mounting hole and a plurality of threaded mounting holes, a circular shaped clutch element having a rectangular shaped center hole, four, equally spaced cam surfaces formed parallel to a center line of said clutch element, a flat surface formed at a first end of each of said four cam surfaces perpendicular to said cam surfaces, at least one hole formed in each of said flat surfaces, and at least one coil spring mounted in each of said holes formed in each of said flat surfaces, said clutch element being inserted into said ring for rotation within said inner periphery clutch surface, a space being formed between each of said cam surfaces and said clutch surface, a roller mounted in each of said spaces between said cam surfaces and said clutch surface, a handle arm, having mounting holes, and being fastened to said ring using said threaded mounting holes for sealing said clutch element between said ring and said handle arm, and said clutch element being mounted on said drive shaft, thereby forming a one-way clutch handle for said fishing reel.

2. A combination of a fishing reel having a drive shaft and an improved fishing reel handle having a one-way clutch handle incorporated therein as set forth in claim 1, wherein at least two holes are formed in each of said flat surfaces formed in each of said four cam surfaces, and at least one coil spring is mounted in each of said holes formed in each of said flat surfaces.

3. A combination of a fishing reel having a drive shaft, and an improved fishing reel handle having a one-way clutch handle incorporated therein, said fishing reel handle consisting of:

a ring having an inner periphery clutch surface, a mounting hole and a plurality of threaded mounting holes, a circular shaped clutch element having a rectangular shaped center hole, four cam surfaces formed parallel to a center line of said clutch element, four flat surfaces each of said flat surfaces formed perpendicular to each of said cam surfaces, two holes formed in each of said flat surfaces, said clutch element being inserted into said ring for rotation within said inner periphery clutch surface, a space being formed between each of said four cam surfaces and said clutch surface, at least one spring being mounted in each of said holes formed in said flat surfaces, a roller mounted in each of said spaces between said cam surfaces and said clutch surface, each of said rollers being urged into engagement with said clutch surface by said springs, a handle arm, having mounting holes, and being fastened to said ring using said threaded mounting holes for sealing said clutch element between said ring and said handle arm, and said clutch element being mounted on said drive shaft thereby forming a one-way clutch handle for said fishing reel.

\* \* \* \* \*